M. P. TURNER.
Track-Clearer.

No. 220,263. Patented Oct. 7, 1879.

Witnesses:
Frank W. Heers.
Albert Collins.

Inventor:
Mahlon P. Turner,
By Thomas G. Orwig, Atty.

UNITED STATES PATENT OFFICE.

MAHLON P. TURNER, OF DES MOINES, IOWA.

IMPROVEMENT IN TRACK-CLEARERS.

Specification forming part of Letters Patent No. 220,263, dated October 7, 1879; application filed July 23, 1879.

*To all whom it may concern:*

Be it known that I, MAHLON P. TURNER, of Des Moines, in the county of Polk and State of Iowa, have invented an Improved Railway-Track Clearer, of which the following is a specification.

The object of my invention is to save labor and expense in keeping railway-tracks clear of snow and dirt, and to thereby diminish friction and wear in operating cars.

Heretofore brushes of various forms have been fixed to cars to sweep the track-rails in advance of the moving wheels, and snow-plows have been rigidly fixed to a car in different ways to clear the track or road-bed, as the car was advanced by horse power or a locomotive-engine.

Snow-plows or scrapers having brooms attached have also been suspended from the bottom of a car by hinging them to a shaft or king-bolt extending downward from the car, in such a manner that they could be adjusted by means of pinions and racks to assume a V-shaped position and throw dirt to the right and left of the car and track as the car advanced, or to form a diagonal line across the car and track to push all obstructions to the right or to the left, as occasion might require; but no complete self-adjusting device has been applied to a car that will at all times automatically brush the track-rails, and also clear the road-bed of snow when occasion requires, as contemplated by my improvement, which consists in suspending reversible V-shaped track-clearers to each end of a car, as hereinafter fully set forth.

Figure 1:
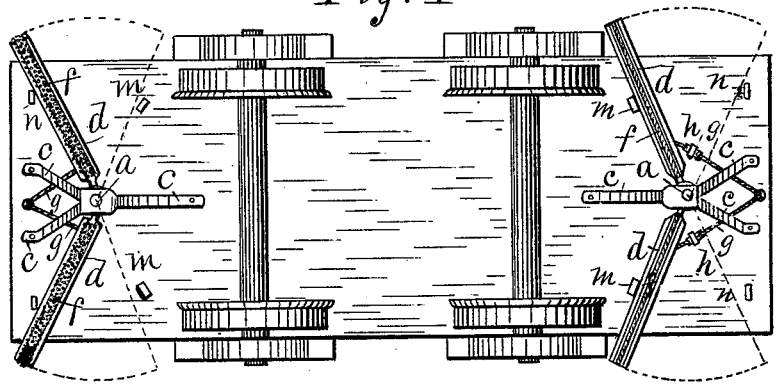
Figure 2:
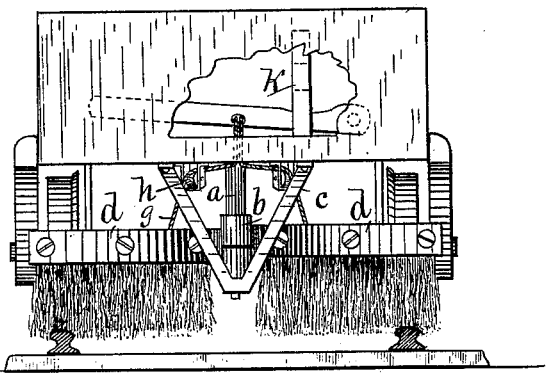
Figure 3:
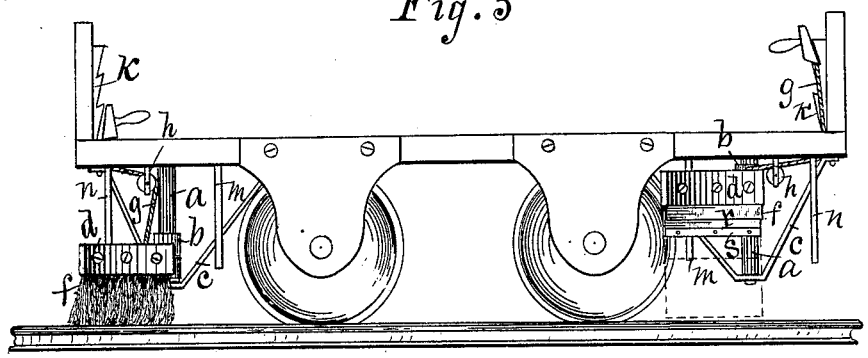

Figure 1 of my drawings is a view of an inverted car to which my improvement is attached. Fig. 2 is an end view of the same car, right side up. Fig. 3 is a side view, showing the car on the track. Together they illustrate the construction, application, and operation of my complete invention.

$a$ is a shaft fixed to the under side of a car, to extend downward and form a bearing for a sleeve, $b$, of corresponding form and size.

$c\ c$ represent braces extending from the car to the lower end of the vertical shaft $a$.

$d\ d$ are rigid bars or arms independently hinged to the sleeves $b$ on the shaft $a$ in such a manner that they will extend outward horizontally over the track-rails and swing backward and forward. From the lower edges of these vibrating arms $d$ suitable scrapers, brushes, or brooms $f$ extend downward toward the track-rails and road-bed over which the car is designed to travel. In the normal condition of the arms $d$ the scrapers or sweepers $f$ will rest upon the track-rails and brush their top surfaces clean of dirt or snow in advance of the wheels as the car moves.

$g\ g$ are cords attached to the hinged arms $d$. They pass upward over pulleys $h$ fixed to the under side of the car, and from thence to the end of the car, and then jointly upward over or through a suitable bearing, to be connected with an adjustable lever, ratchet, or wheel, $k$, by means of which the united cords can be wound up or shortened as required to elevate the arms $d$, and thereby make the track-clearers $f$ inoperative, or to regulate their pressure upon the track.

$m\ m$ and $n\ n$ represent stops projecting downward from the car to restrict the swinging motions of the hinged arms and track-clearers $d\ f$.

$r$ (shown in Fig. 3) represents one or more pieces of leather or other suitable material fixed to the hinged arm $d$. To the bottom edge of the flexible strip $r$ I fix a rigid strip of plate-iron, or other suitable material, that will stiffen the edge of the complete scraper in such a manner that it will be strong enough to push stones or other obstructions from the track, and at the same time elastic enough to yield to immovable objects and to the up-and-down motion of the ends of the car.

In the practical operation of my invention, thus constructed and applied, the hinged track-clearer will, by force of gravity, descend as far as allowed by the cords $g$ and the shaft $a$, from which they extend. If the brush or scraper part $f$ is flexible it will conform to the shape of the track, when allowed to rest upon it, and, as the car is advanced, brush, sweep, and scrape the track. The friction thus produced on the track will cause the free ends of the clearers $d\ f$ to be turned rearward, so that they will be inclined outward and rearward in opposite directions from the center of the car, as required to push snow or other obstructions from between the track-rails to the outside of the rails. Each V-shaped track-clearer at each end of the car will be thus automatically operated by the movement of the car regardless of the direction of advance. When the movement of the car is reversed the position of the hinged track-clearers will also be reversed. When a car rocks on a track, and one end is up and the other down, the hinged track-clearers conform to the same motion, and therefore will always perform their functions and sweep the rails clean even when the car-wheels may jump over portions of the rails as the car is advancing.

My invention is specially adapted for street-railways, but may be advantageously used on any car that travels upon parallel rails.

I claim—

1. In a railway track clearer, the combination of the shaft $a$, the shaft-bearer composed of the braces $c$, and the self-adjusting hinged arms $d$, substantially as and for the purposes shown and described.

2. The fixed shaft $a$, the shaft-bearing braces $c$, the sliding sleeve $b$, and the self-adjusting arms $d$, carrying a scraper, broom, or brush $f$, arranged and combined, substantially as shown and described, to operate in the manner set forth.

3. The shaft $a$, the hinged self-adjusting arms $d\ d$, carrying scrapers or brushes $f$, and the fixed stops $m\ n$, arranged and combined, substantially as shown and described, to operate in the manner specified.

4. The combination of the hinged arm $d$, the flexible scraper $r$, and the rigid re-enforcing strip $s$, substantially as and for the purposes set forth.

5. The shaft $a$, rigidly fixed to the bottom of a car, the hinged arms $d\ d$, and the flexible scrapers $r\ s$, arranged and combined, substantially as shown and described, to operate in the manner and for the purposes specified.

6. The shaft $a$, the sleeve $b$, the braces $c$, the hinged arms $d$, carrying brushes or scrapers $f$, the cords $g$, the pulleys $h$, a cord-operating device, $k$, and the fixed stops $m\ n$, arranged and combined, substantially as shown and described, to form a track-clearer that will automatically adjust itself relative to the movements of the car, and that can readily be adjusted to regulate the pressure of the scrapers or sweepers, or to make them inoperative, substantially as set forth.

MAHLON P. TURNER.

Witnesses:
FRANK W. HEEBS,
THOMAS G. ORWIG.